United States Patent

Kuhn et al.

[11] Patent Number: 6,085,880
[45] Date of Patent: Jul. 11, 2000

[54] POWER SHIFT TRANSMISSION

[75] Inventors: Walter Kuhn; Markus Hoher, both of Friedrichshafen, Germany

[73] Assignee: ZF Friedrichshafen AG, Friedrichshafen, Germany

[21] Appl. No.: 09/301,806

[22] Filed: Apr. 28, 1999

[30] Foreign Application Priority Data

May 16, 1998 [DE] Germany ............ 198 22 193

[51] Int. Cl.$^7$ .................................................. F16H 3/78
[52] U.S. Cl. .................... 192/3.52; 192/221; 192/51; 192/53.32; 475/139; 475/317
[58] Field of Search ........................ 192/3.52, 221, 192/18 R, 18 A, 21, 51, 53.32; 475/138, 139, 317; 74/411.5, 339; 188/68

[56] References Cited

U.S. PATENT DOCUMENTS 3,059,504 10/1962 Hill .................................. 74/339 X
5,031,746 7/1991 Koivunen ............................. 192/85
5,083,993 1/1992 Öun ................................... 475/299
5,890,988 4/1999 Kasuya et al. ................... 475/317 X

FOREIGN PATENT DOCUMENTS

| 1 750 546 | 1/1971 | Germany . |
| 43 27 435 A1 | 3/1994 | Germany . |
| 43 24 809 A1 | 1/1995 | Germany . |
| 195 06 987 A1 | 8/1996 | Germany . |

*Primary Examiner*—Richard M. Lorence
*Attorney, Agent, or Firm*—Davis and Bujold

[57] ABSTRACT

The power shift for vehicles has clutches and brakes in the form of multi-disc clutches which consist of disc sets; instead of the multi-disc brake for the reverse drive range, a form-locking clutch such as a disc synchronization is provided which in engaged state transmits the retaining torque via form locking and in disengaged state is freely rotatable and thus free of loss.

7 Claims, 2 Drawing Sheets

PRIOR ART Fig. 1

POWER SHIFT TRANSMISSION

BACKGROUND OF THE INVENTION

This invention concerns a power shift transmission, such as a continuously variable automatic power transmission for vehicles, which has clutches and brakes in the form of multi-disc clutches consisting of sets of discs wherein all outer discs of a disc set are supported by an outer disc carrier and all inner discs of a disc set, by an inner disc carrier, and which are engaged and disengaged by pistons.

The Applicant's DE-A 43 24 809 has disclosed a hydrodynamic multi-disc clutch for power transmission of passenger cars, trucks and work machinery having one operating cylinder, which surrounds a pressure chamber and pressure-actuated pistons placed therein for clutches consisting of disc sets, which with switching devices and transmission gears are situated around an input shaft. In this multi-disc clutch, all outer discs of a disc set are accommodated by an outer disc carrier and all inner discs by an inner disc carrier, gear clutches serving for brief interruption of the power flow, such as for the purpose of engaging a different transmission ratio.

Depending on the possible control, a difference is made here between those which can be power shifted only when parked and those which can be engaged during operation or under load. The latter are, almost without exception, so-called friction clutches in which the torque is transmitted by friction between the clutch surfaces pressed upon each other. If the friction surfaces consist of several thin discs, i.e. laminae, the clutch is designated as multi-disc clutch. Multi-disc clutches are mainly used where the gear has to be changed at high peripheral speeds. In the hydraulically actuatable clutches, oil pressure builds up in the pressure chamber surrounded by the hydraulic cylinder and the actuatable clutches placed therein.

From the Applicant's DE-A 195 06 987 has -further become known a disc synchronization for the torque-transmitting connection of two rotating parts of a power shift transmission, especially the connection of a transmission shaft with a gear wheel rotatably supported on the transmission shaft. The disc synchronization serves to simplify a manual control, since during the synchronization the speed adaptation of the transmission components to be interconnected is carried out automatically or under control. A sliding sleeve has an outer disc carrier which is connected with a switching device and an inner disc carrier, there being provided, between the disc carriers, a disc set of which adjacent discs are alternatively connected either with the inner disc carrier or with the outer disc carrier. In the case of difference of speed between the outer disc carrier and the inner disc carrier, a synchronizing torque can be obtained with the discs.

Between the synchronous body and the gearwheel is provided a clutch body in the form of clutch discs, which can mesh with an inner spline in a corresponding outer spline on the gear wheel or on the transmission shaft. The clutch bodies are axially limitedly movable, the synchronous body, on one hand, and, on the other, a spring device situated between clutch body and gearwheel forming axial limitations. With such a disc synchronization, it is possible without problem to prevent jerks and noises produced by switching with high synchronous torque and slight engagement effort at the same time.

Modern continuously variable automatic power shift transmissions have, as a rule, power shift components in the form of multi-disc brakes or multi-disc clutches. In particular for a reverse drive range, there is used here a multi-disc brake, which combined with a planetary set causes a reversal of speed and torque. The multi-disc brake is engaged mostly when parked or with low load and at low speed. In a forward drive range, the multi-disc brake will not be necessary and is idle with significant drag torque. A multi-disc brake or multi-disc clutch further needs, depending on the torque to be transmitted, requires an adequate space. The piston stroke, with the appertaining ventilation play and wear, has a negative effect.

SUMMARY OF THE INVENTION

The problem on which this invention is based, is to provide a power shift transmission, such as a continuously variable automatic power transmission, which requires a small installation space and the effectiveness of which is improved in forward drive operation.

By using, in accordance with the invention, a form-locking clutch, for example, in the form of a disc synchronizer instead of the conventional multi-disc brake or multi-disc clutch, the installation space of the transmission is not inconsiderably reduced while in forward drive operation, effectiveness is improved by the fact that no more drag torques appear due to operation at idle of the multi-disc brake or multi-disc clutch. At the same time, the power needed for actuating the piston is reduced, since no friction torque proportional to the retaining torque has to be transmitted, i.e. less pumping power is required. If the dog clutch provided, according to the invention, for example, is a disc synchronization, the retaining torque is transmitted exclusively by form locking. The disc synchronizer is disengaged by a spring after which the switching parts are freely rotatable and thus free of friction produced losses.

BRIEF DESCRIPTION OF THE DRAWING(S)

The invention is explained in detail herebelow with reference to the drawings which show an advantageous embodiments. In the drawings:

FIG. 1 is a partial section through a continuously variable automatic power shift transmission, having the essential parts of a conventional power shift component; and FIG. 2 is a section through the transmission with disc synchronization, according to the invention, instead of the conventional power shift component.

DESCRIPTION OF THE PREFERRED EMBODIMENT(S)

Figure 1:
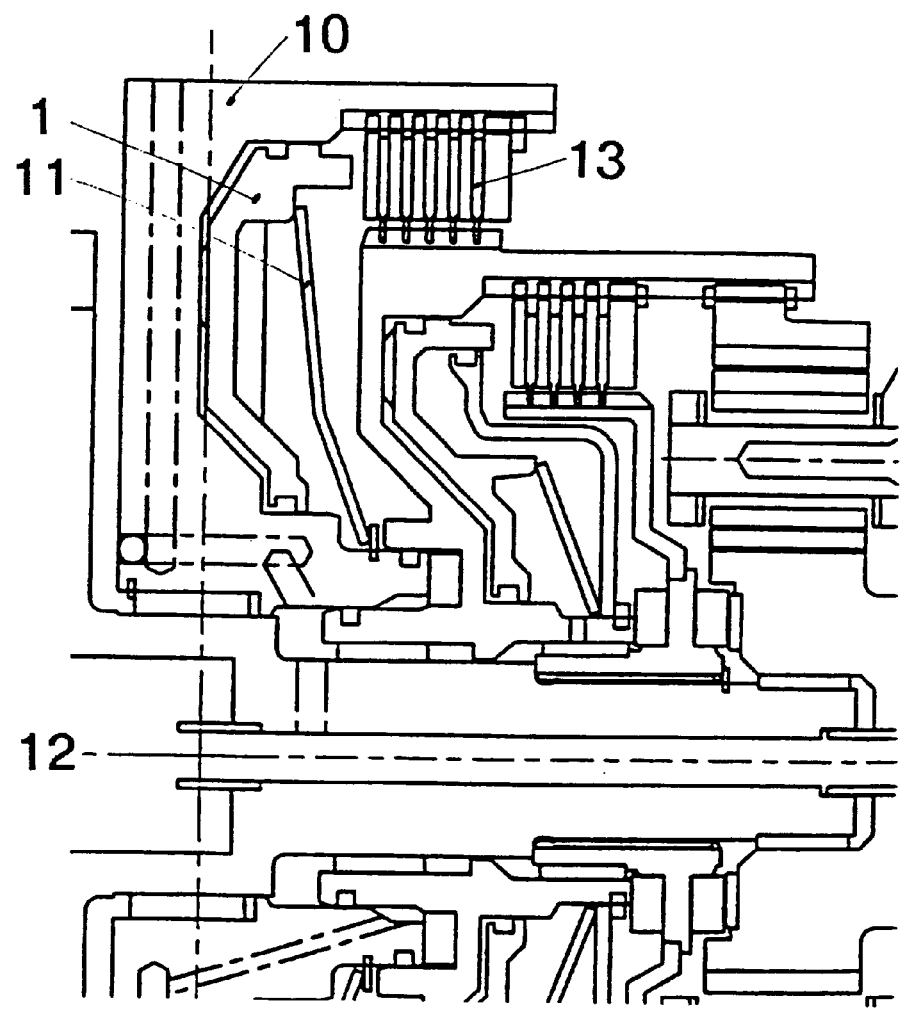

In both figures, only the parts essential for the understanding of the invention are marked with numerals. In the partial section, shown in FIG. 1, through a conventional continuously variable automatic power shift transmission, 12 is the transmission axle, 10 is one part of the housing, 13 is a conventional multi-disc brake, 1 is a piston and 11 is a spring that biases the piston 1 in direction of the disengagement position. The multi-disc brake 13 (shown here) is actuated in a reverse drive range by moving the piston 1 in the housing 10 so as, with a planetary set to effectuate a speed and torque reversal of the transmission. In a forward drive range, on the other hand, the multi-disc brake 13 is not needed and operates at idle with a high drag torque.

Figure 2:
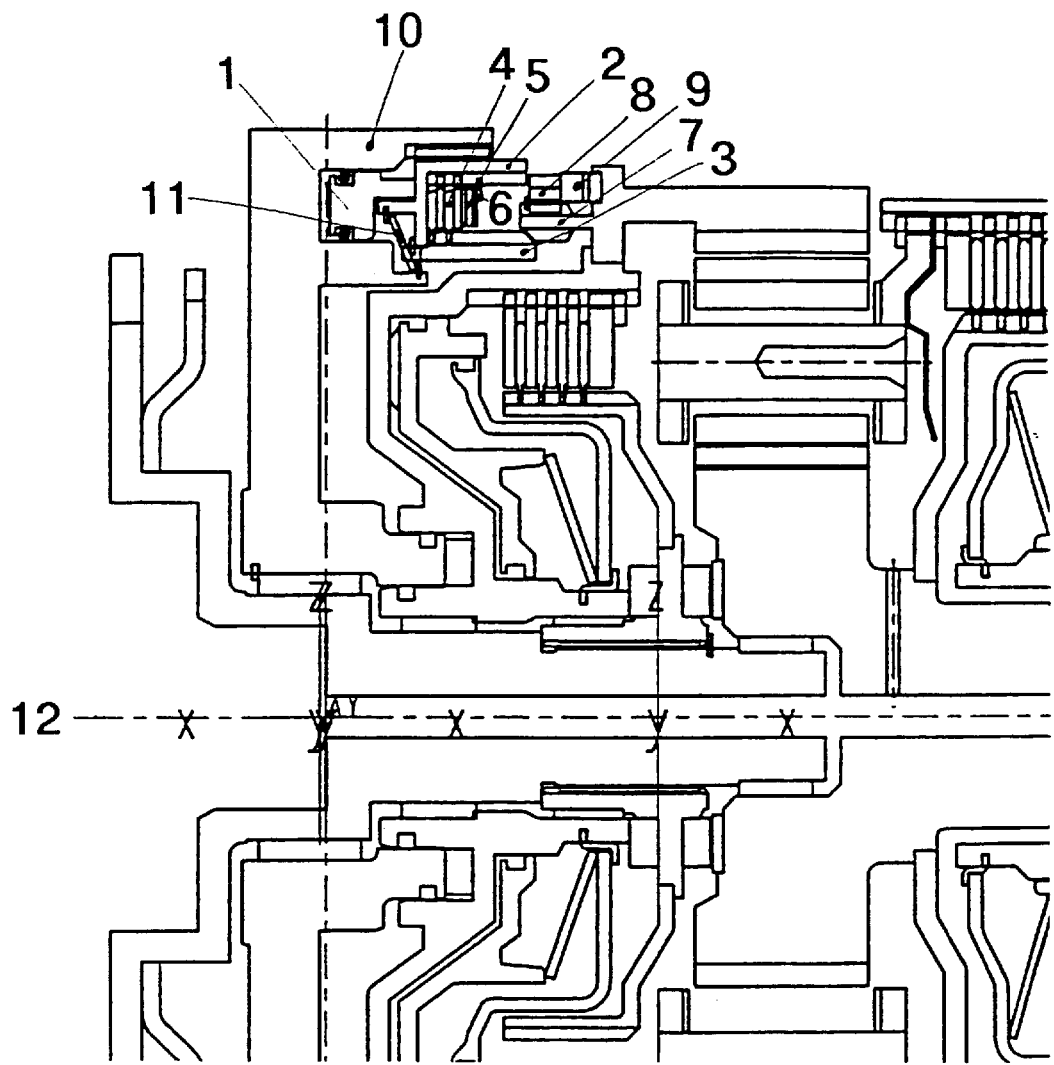

In accordance with the invention, as the partial section in FIG. 2 shows, a disc synchronizer is used, instead of the conventional multi-disc brake 13, so that in the forward drive range no drag torque appears. In the housing 10 is movably supported a piston 1, which is biased by a spring 11 in the direction of disengagement. In order to engage the disc synchronizer, the piston 1, in FIG. 2, is moved to the right whereby the whole disc set, comprised of outer disc carrier 2, inner disc carrier 3 with friction discs and steel discs 4 and spring 5, are likewise moved to the right. A snap ring 6 is also moved.

The outer disc carrier 2 now has a regular spline, which is dependent on the transmitting capacity, i.e. on the retaining torque.

On the contrary, the inner disc carrier 3 has a spline with large teeth pitch, i.e. it has only a few teeth. By virtue of this, the inner disc carrier 3 can mesh with higher probability in the mating gear with teeth of similar pitch, which are located on the rotating transmission part 7.

On the other hand, the outer disc carrier 2 with its normal space width will mostly stay tooth on tooth with its mating gear, i.e. the ring 8, and thus cannot mesh. Therefore, it pushes the ring 8 against the spring 9, the ring 8 being axially movably supported, via a spline section, upon the rotating transmission part 7.

After the meshing of the inner disc carrier 3, the latter is moved along, i.e. shifted along, by the transmission part 7. The disc set 4, with the friction force of the spring 5, now decelerates the inner disc carrier 3 and thus synchronizes the outer disc carrier 2 with the inner disc carrier 3 until the speed difference becomes δn=0. At the same or very low speed, the outer disc carrier 2 can then mesh in the ring 8 which is pushed by the spring 9. At this moment, positive locking prevails between the housing 10 and the transmission part 7.

The disc synchronizer is disengaged, via the spring 11 that pressurizes the piston 1, after a corresponding pressure drop in the piston chamber after which the switching parts are freely rotatable and free of friction loss.

Therefore, due to the low pumping power, the use of the disc synchronizer results in a reduction of the installation space and, in forward drive range, in an improvement of effectiveness resulting now from the absence of drag torques.

What is claimed is:

1. A power shift transmission for a continuously variable automatic power shift transmission for vehicles, which has clutches and brakes in the form of multi-disc clutches and multi-disc brakes comprising disc sets wherein all outer discs of a disc set are supported by an outer disc carrier and all inner discs of a disc set are supported by an inner disc carrier and are engaged and disengaged by pistons, wherein the transmission has, instead of a multi-disc clutch or brake for a reverse drive range, a disc synchronizer which, in an engaged state, transmits retaining torque by means of positive locking and in a disengaged state is freely rotatable and thus free of friction loss.

2. The transmission according to claim 1, wherein the disc synchronizer has a pressure chamber with a piston (1) movably supported therein, the piston being pressurized by a spring (11) in a direction of the disengagement, a disc set having an outer disc carrier (2) and an inner disc carrier (3) with friction and steel discs (4), and a spring (5) which biases a ring (8), the ring being axially movably supported via a spline on a rotating transmission part (7).

3. The transmission according to claim 2, wherein said outer disc carrier (2) has a regular spline for meshing in the ring (8) which has the same regular spline.

4. The transmission according to claim 3, wherein said inner disc carrier (3) has a spline with a tooth pitch which is considerably larger than the tooth pitch of said disc carrier (2), for meshing in a mating gear having substantially the same tooth pitch as the inner disc carrier and which is supported on the rotating transmission part (7).

5. A power shift transmission for a continuously variable automatic power shift transmission for vehicles, which has clutches and brakes in the form of multi-disc clutches and multi-disc brakes comprising disc sets wherein all outer discs of a disc set are supported by an outer disc carrier and all inner discs of a disc set are supported by an inner disc carrier and are engaged and disengaged by pistons, wherein the transmission has, instead of a multi-disc clutch or brake for a reverse drive range, a disc synchronizer which, in an engaged state, transmits retaining torque by means of positive locking and in a disengaged state is freely rotatable and thus free of friction loss; and wherein the disc synchronizer has a pressure chamber with a piston (1) movably supported therein, the piston being pressurized by a spring (11) in a direction of the disengagement, a disc set having an outer disc carrier (2) and an inner disc carrier (3) with friction and steel discs (4), and a spring (5) which biases a ring (8), the ring being axially movably supported via a spline on a rotating transmission part (7).

6. The transmission according to claim 5, wherein said outer disc carrier (2) has a regular spline for meshing in the ring (8) which has the same regular spline.

7. The transmission according to claim 6, wherein said inner disc carrier (3) has a spline with a tooth pitch which is considerably larger than the tooth pitch of said disc carrier (2), for meshing in a mating gear having substantially the same tooth pitch as the inner disc carrier and which is supported on the rotating transmission part (7).

* * * * *